May 5, 1959

H. A. KLUG 2,884,918

ENGINE CHARGE-FORMING MEANS

Filed July 2, 1956

INVENTOR.
HARRY A. KLUG
BY
Christopher L. Waal
ATTORNEY

United States Patent Office 2,884,918
Patented May 5, 1959

2,884,918
ENGINE CHARGE-FORMING MEANS
Harry A. Klug, Milwaukee, Wis.
Application July 2, 1956, Serial No. 595,259
4 Claims. (Cl. 123—139)

The present invention relates to internal combustion engines and more particularly to fuel systems for such engines.

An object of the invention is to provide an internal combustion engine having improved means for forming a combustible charge and for controlling the fuel-air ratio under various load conditions.

Another object is to control fuel admission by an air intake valve of the engine in such manner as to avoid interference with firm closing of the valve against its seat.

Still another object is to provide an engine fuel system in which flow of fuel for the combustible charge is controlled jointly in accordance with throttle setting and intake manifold vacuum.

A further object is to provide means whereby the vacuum-responsive fuel control is automatically rendered ineffective when the engine is cold.

The invention further consists in the several features hereinafter described and claimed.

In the accompanying drawing.

Figure 1:
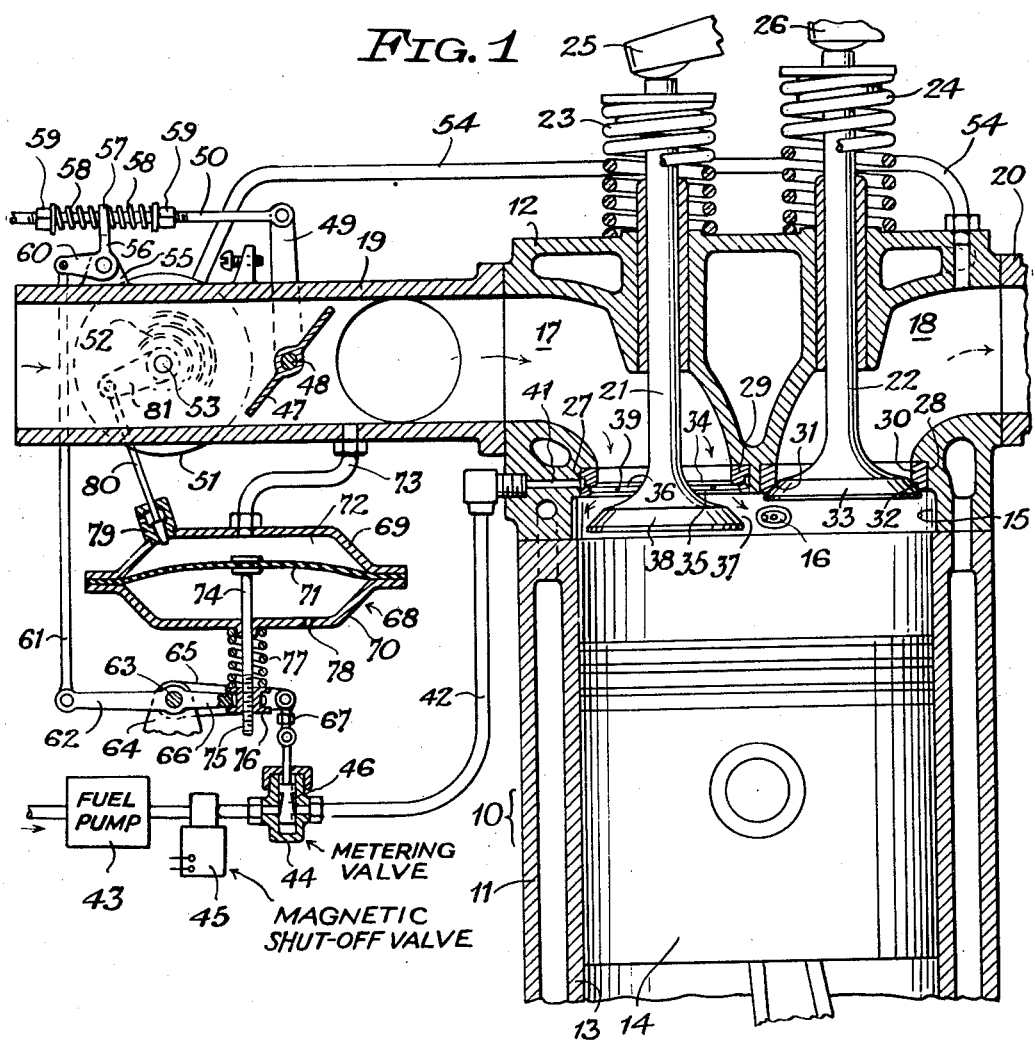
Fig. 1 is a schematic view showing an internal combustion engine with a fuel system of the invention, parts being shown in section.

In the drawing, 10 designates an internal combustion engine including a cylinder block 11 and a cylinder head 12, the engine preferably being of the four-cycle valve-in-head type. Within the block 11 are formed the usual cylinders 13 in each of which is arranged a piston 14. Each cylinder includes a combustion chamber 15 which extends into the head and is provided with a spark plug 16. Formed in the head are intake and exhaust passages 17 and 18 which communicate at their inner ends with the combustion chamber and at their outer ends with respective intake and exhaust manifolds 19 and 20. The intake manifold 19 and head intake passage 17 form an air induction conduit. The inner ends of the intake and exhaust passages are controlled by respective poppet valves 21 and 22 which are normally urged to closed position by respective coil springs 23 and 24 and are opened by the usual valve actuating means 25 and 26.

Counterbores 27 and 28 are formed in the cylinder head around the inner ends of the intake and exhaust passages 17 and 18, and have pressed therein respective valve-seat insert rings 29 and 30 cooperating with the associated valves 21 and 22. The exhaust valve-seat insert ring 30 is of usual construction and has a bevelled seat 31 engageable by the bevelled edge 32 of the exhaust valve head 33.

Figure 3:
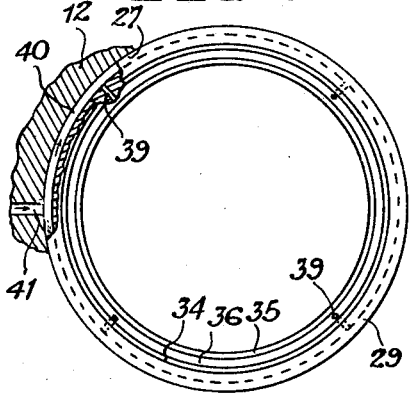
Fig. 3 is a bottom view of an intake valve seat ring, parts thereof and fragmentary parts of an associated cylinder head being shown in section.
Figure 2:
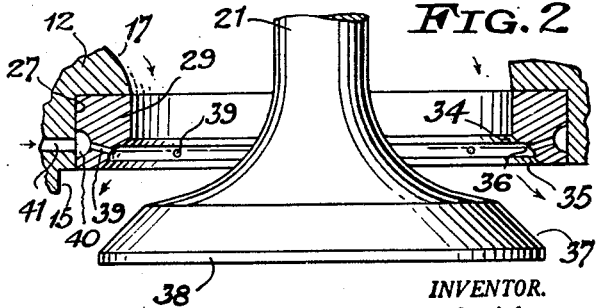
Fig. 2 is an enlarged fragmentary sectional view of an intake valve of the engine.

The intake valve-seat insert ring 29, which defines an air intake port, has a bevelled seat formed by two narrow annular lands 34 and 35 lying in the same conical surface and separated by a narrow and shallow annular groove 36, the seat-forming lands being engageable by the bevelled edge 37 of the intake valve head 38. A number of radial fuel admission ports or orifices 39 of small diameter are formed in the ring 29 at circumferentially spaced points of the ring and communicate at their discharge ends with the groove 36 and at their other ends with an annular channel or passage 40 formed in the outer periphery of the insert ring, the outer side of the channel 40 being closed by the cylindrical wall of the counterbore 27. A fuel duct 41 in the cylinder head communicates with the passage-forming channel 40 and is connected to a fuel pipe 42 to which gasoline is supplied under pressure, as by a fuel pump 43. Preferably, as seen in Fig. 3, the fuel duct 41 is offset peripherally of the insert ring from the nearest fuel ports 39. A metering valve 44 and a magnetically opened shut-off valve 45 are connected in the fuel pipe downstream from the fuel pump. If desired, the shut-off valve may be controlled coincidentally with the ignition. The fuel metering valve 44, which forms a flow rate controller or regulator, includes a movable valve member 46 which by way of example is here shown to be of the plunger or rod type, although, if desired, it could be of the rotary plug type. The metering valve is controlled as hereinafter described.

The intake manifold 19 is provided with a throttle valve 47 on a rock-shaft 48 an arm 49 of which is operatively connected by a rod 50 to suitable actuating means, such as an accelerator pedal, not shown, to control the flow of air to the engine. The manifold carries a thermostat 51 including a temperature-responsive element 52 of conventional spiral bimetallic type operatively connected to a rock-shaft 53, the angular position of the rock-shaft thus being temperature-controlled. The thermostat is connected to the exhaust passage 18 (or exhaust manifold) by a flow-limiting tube 54, the exhaust gases being suitably discharged from the thermostat, as into the intake manifold. The purpose of the thermostat is hereinafter described.

A bracket 55 on the intake manifold carries a bell-crank 56 one fork-ended arm 57 of which is yieldably coupled to the throttle rod 50 by interposing the end of the arm between a pair of compressed coil springs 58 surrounding the rod, the springs being adjustably compressed by nuts 59 on the rod. The other arm 60 of the bell-crank lever is connected by a link 61 to a lever arm 62 on a rock-shaft 63 carried on a bracket 64. The rock-shaft carries two other arms 65 and 66, the former being connected by a longitudinally adjustable link 67 to the shiftable valve member 46 of the metering valve 44. By the linkage above described, opening of the throttle valve to increase the air supply to the engine will simultaneously effect opening of the metering valve to increase the flow of fuel.

The metering valve 44 is also controlled by the vacuum or subatmospheric pressure in the intake manifold. For this purpose there is provided a diaphragm device 68 which comprises a pair of upper and lower dish-shaped casing members 69 and 70 clamping between them the marginal portion of a flexible diaphragm 71, the diaphragm and upper casing member 69 forming a chamber 72 which is connected by a tube 73 to the intake manifold at a point downstream from the throttle valve. The diaphragm carries a central downwardly projecting stem 74 which passes through and is slidably guided by the lower casing member 70. The stem has a screw-threaded lower end portion 75 which adjustably carries thereon a spool-shaped nut-forming collar 76. A compressed coil spring 77 surrounds the stem between the casing member 70 and the collar and urges the diaphragm downwardly so as to oppose displacement of the diaphragm by differential pressure caused by the presence of a vacuum or subatmospheric pressure in the chamber 72. The lower side of the diaphragm is open to atmosphere, the casing member 70 having a vent opening 78 to avoid excessive restraint on the movement of the diaphragm.

The diaphragm 71 is operatively connected to the rockshaft 63 of the metering valve linkage by the rock-shaft arm 66 which engages the flanged collar 76 of the stem 74. The diaphragm is urged upwardly as the manifold vacuum increases, thus moving the valve member 46 of the fuel metering valve toward closed position. Upon decrease of manifold vacuum, the spring 77 displaces the diaphragm downwardly, thereby effecting opening of the metering valve. The coupling springs 58 on the throttle rod permit a limited displacement of the metering valve member 46 by the diaphragm irrespective of throttle setting. The metering valve 44 is thus controlled jointly by throttle setting and manifold vacuum.

The upper casing member 69 of the diaphragm device 68 has a vent or bleed valve 79 with a movable valve member 80 connected to an arm 81 on the shaft 53 of the thermostat 51. When the engine is cold the bleed valve 79 is open, thus limiting the degree of vacuum in the diaphragm chamber 72, with the result that the metering valve 44 will pass an increased amount of fuel then required for engine operation. When the engine warms up the bleed valve closes.

When the engine is in operation, the magnetically actuated shut-off valve 45 is energized to open position and the fuel pump 43 delivers gasoline through the metering valve 44, fuel pipe 42 and duct 41 to the annular channel 40 in the intake valve-seat insert ring 29. From the channel 40 the gasoline flows inwardly through the radial ports 39 to the annular groove 36 between the narrow seat-forming lands 34 and 35, the gasoline spreading along the groove. At the beginning of the suction stroke of the engine, the intake valve 21 opens, permitting gasoline to issue from the ports 39 and causing air to be drawn into the cylinder from the air intake manifold 19 and cylinder head intake passage 17. Depending on fuel pump pressure and opening of the metering valve, the gasoline will issue gradually from the ports 39 or be sprayed therefrom, and sufficiently forceful sprays may impinge on the upstream side of the intake valve head. In flowing through the valve-seat insert ring, the incoming air entrains gasoline from the fuel groove 36 and lower seat-forming land 35, and from the sprays, in the form of a fine mist. A combustible charge is thus formed in the cylinder. At the end of the intake portion of the engine cycle, the intake valve closes firmly against the narrow seat-forming lands 34 and 35, blocking the intervening fuel groove 36. The charge is then compressed and fired. After the combustion stroke the exhaust valve 22 is opened to discharge the burned gases, and the cycle of operation is repeated. Until the engine warms up the rock-shaft 53 of the heat control device 51 holds open the bleed valve 79 of the diaphragm chamber 72, so that intake manifold vacuum has little effect on the operation of the fuel metering valve 44.

When the throttle valve 47 in the air intake manifold is moved toward its closed position for idling or light-load operation of the engine, the throttle linkage also actuates the fuel metering valve toward its closed position, and when the throttle valve is opened, the metering valve is correspondingly opened to supply the requisite amount of fuel. During idling and light-load conditions, a fairly high vacuum exists in the intake manifold. With the engine at normal operating temperature, the bleed valve 79 of the diaphragm chamber 72 is closed so that substantially the same degree of vacuum exists in the intake manifold and the diaphragm chamber, causing upward displacement of the diaphragm and actuating the fuel metering valve toward closed position so as to limit the fuel flow. This diaphragm actuation of the metering valve also occurs when the engine is decelerated, thus avoiding excessive flow of fuel during the deceleration period. When the throttle valve is opened, the intake manifold vacuum decreases and the metering valve is opened jointly by the throttle linkage and the spring 77 of the diaphragm device, so as to supply the requisite amount of fuel to the engine.

The spaced, narrow seat-forming lands 34 and 35 on the intake valve-seat insert ring 29 insure firm seating of the intake valve 21 and proper sealing of the fuel groove 36. These seat-forming lands can be made relatively narrow since the fuel admission ports 39 open at the intervening groove 36 rather than directly at a seating surface. Since the seat-forming lands are relatively narrow, a fuel film deposited thereon and on the bevelled edge 37 of the valve head 38 will not interfere with complete seating of the intake valve. Upon closing of the intake valve a part of this fuel film will be squeezed into the groove 36 and the rest will be squeezed away from the groove.

The air intake manifold 19 and fuel metering valve 44 may serve one or more engine cylinders. If the engine is equipped with two or more metering valves, the movable valve members 46 thereof are simultaneously actuated from the rock-shaft 63, these valve members being adjusted by their associated links 67 to equalize fuel delivery to the cylinders. If the engine has only one metering valve, the rock-shaft arm 65 may be omitted, as the metering valve can be actuated directly from the diaphragm stem 74.

I claim:

1. In a fuel system for an internal combustion engine, an air induction conduit terminating at its downstream end in an intake port having a surrounding valve seat with a fuel orifice therein, a poppet valve engageable with said seat to close said air port and fuel orifice, means including an adjustable fuel flow controller for supplying fuel under pressure to said orifice, a throttle for said air induction conduit, actuating means connecting said throttle and fuel flow controller for increasing the rate of fuel flow as the throttle opening is increased, said actuating means including a resilient coupling yieldable in opposite directions and permitting flow-adjusting movement of the fuel flow controller in opposite senses irrespective of throttle movement, and means responsive to induction conduit vacuum for modifying the control effected by said actuating means on said fuel flow controller.

2. In a fuel system for an internal combustion engine, an air induction conduit having a counterbore at its downstream end, an insert ring fitting in said counterbore and forming an intake port, said insert ring having a valve seat comprising a pair of spaced annular seat-forming lands and an annular groove between said lands, said insert ring further having about its outer periphery a fuel channel and further having a generally radial orifice connecting said channel and said groove, said channel being closed at its outer side by a wall of said counterbore, means for supplying fuel to said channel for distributing fuel from said orifice in a peripheral direction along said groove, and a poppet valve having a head engageable with said spaced seat-forming lands to close said port and said groove.

3. In a fuel system for an internal combustion engine, an air induction conduit with a throttle valve, means including a flow controller for feeding fluid fuel to the engine, means for actuating said controller in flow-increasing sense as the throttle is opened, means responsive to induction conduit vacuum for actuating said flow controller in flow-decreasing sense as the vacuum increases, and thermostatic means for rendering said vacuum-responsive means ineffective when the engine is cold.

4. In a fuel system for an internal combustion engine, an air induction conduit with a throttle for controlling the flow of air to the engine, means including an adjustable fuel flow controller for supplying fuel to the engine, resilient coupling means connecting said throttle and fuel flow controller for actuating said controller in flow-increasing sense as the throttle opening is increased, said resilient coupling means being yieldable in opposite directions from a normal position, and means responsive to induction conduit vacuum for actuating said controller in flow-decreasing sense as said vacuum is increased, said vacuum-responsive means including a movable diaphragm member spring-urged in one direction and displaceable in the other direction under the influence of induction conduit vacuum.

References Cited in the file of this patent
UNITED STATES PATENTS

| | | |
|---|---|---|
| 858,022 | Podlesak et al. | June 25, 1907 |
| 1,211,231 | Raabe | Jan. 2, 1917 |
| 1,869,821 | Moore | Aug. 2, 1932 |
| 2,033,211 | Tice | Mar. 10, 1936 |
| 2,341,257 | Wunsch | Feb. 8, 1944 |
| 2,440,572 | Brandenburg et al. | Apr. 27, 1948 |

FOREIGN PATENTS

| | | |
|---|---|---|
| 492,170 | Great Britain | Sept. 12, 1938 |